Oct. 17, 1961     E. A. ULRICH     3,004,669
FILTER AND AUTOMATIC LEAF SHUT-OFF THEREFOR
Filed June 5, 1957     2 Sheets-Sheet 1
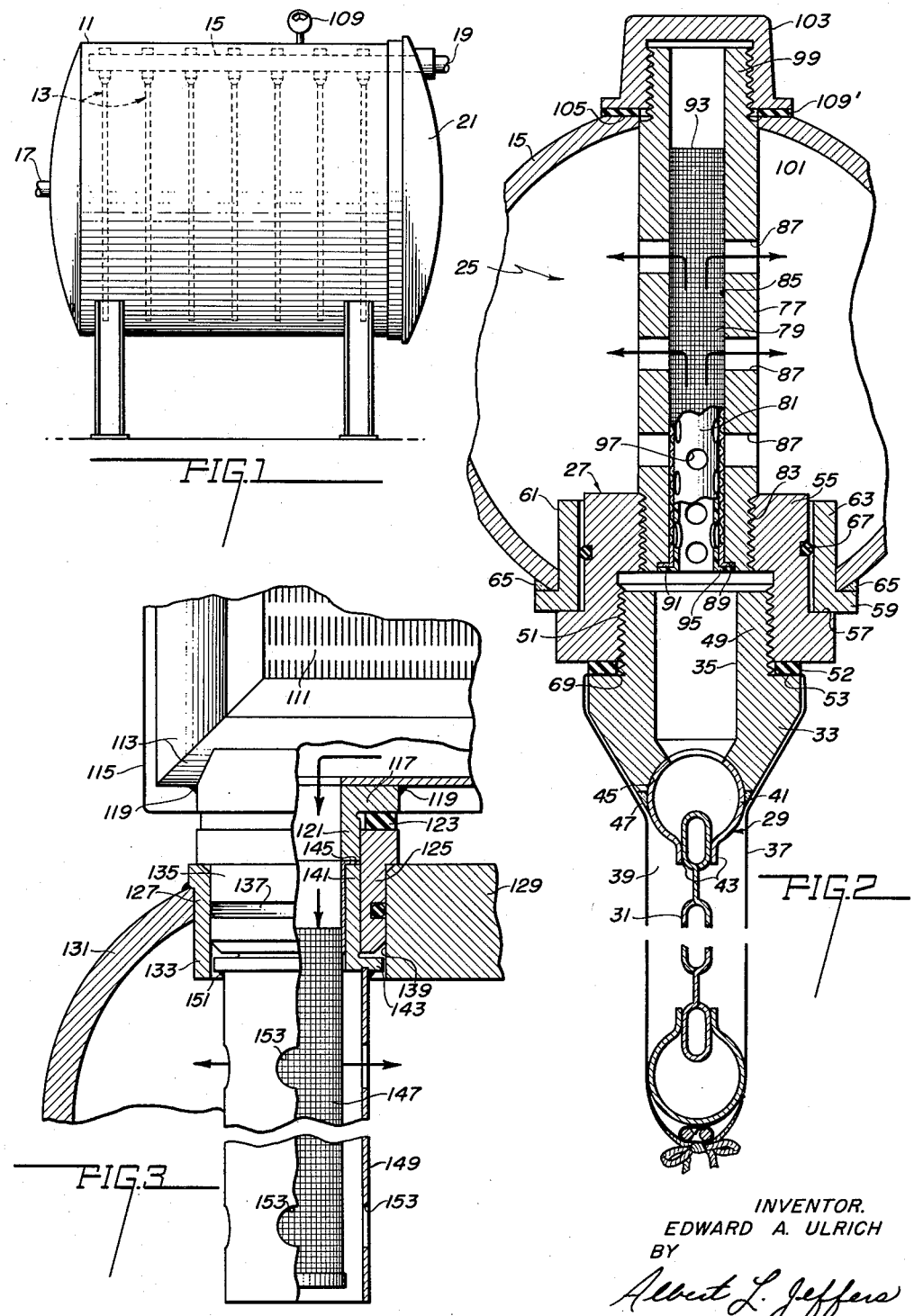
INVENTOR.
EDWARD A. ULRICH
BY
*Albert L. Jeffers*
ATTORNEY

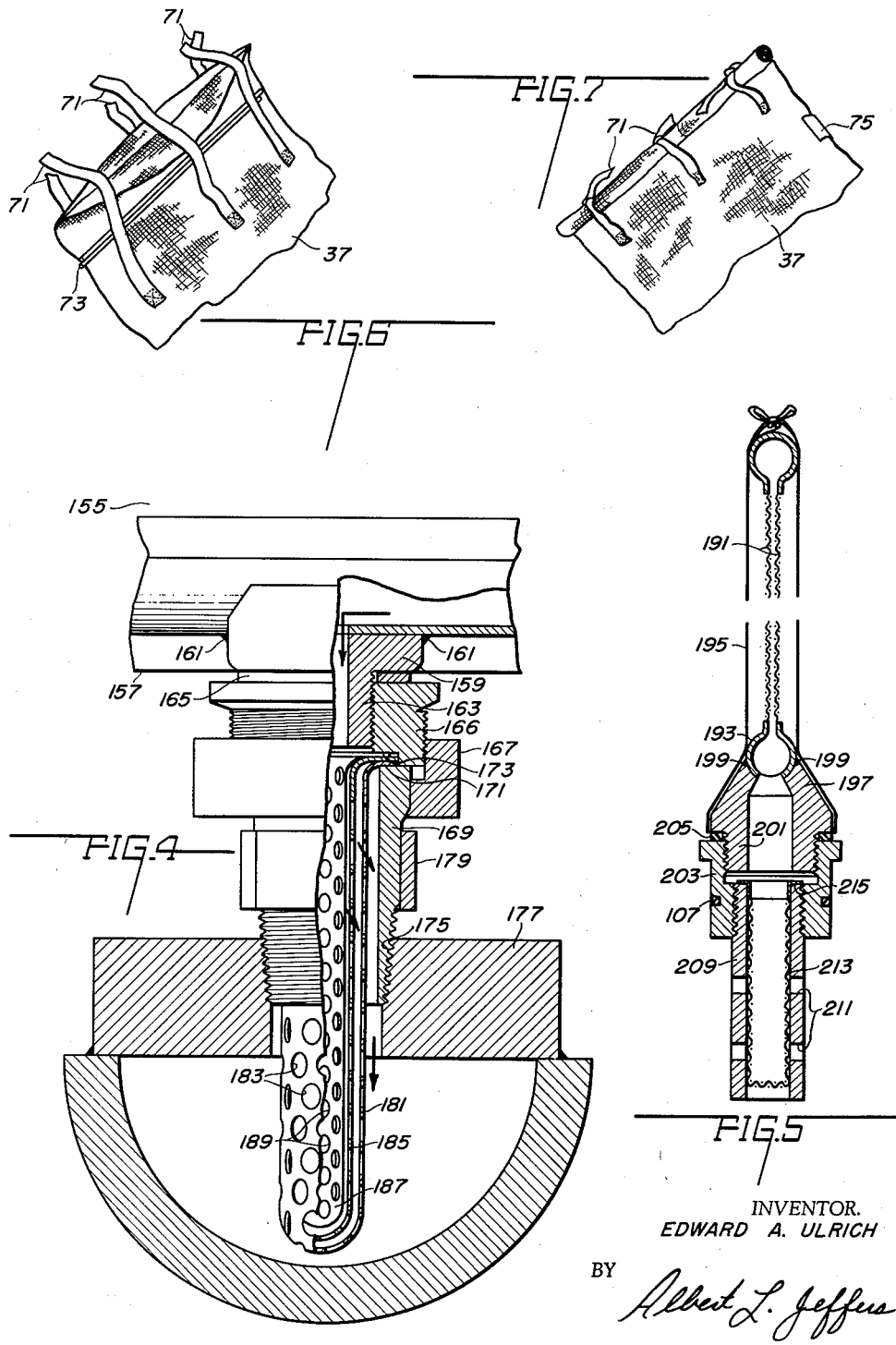

United States Patent Office 3,004,669
Patented Oct. 17, 1961

3,004,669
FILTER AND AUTOMATIC LEAF SHUT-OFF THEREFOR
Edward A. Ulrich, Kenmore, N.Y., assignor to Process Filters, Inc., Buffalo, N.Y., a corporation of New York
Filed June 5, 1957, Ser. No. 663,750
9 Claims. (Cl. 210—347)

The invention relates generally to filter means and more particularly is directed to a filter assembly for removing foreign matter from a liquid.

Filter assemblies embodying the subject invention may be utilized in any system where applicable but as disclosed herein one, or more commonly a plurality are adapted for disposition in a tank containing a liquid to be filtered and all are connected to a manifold or pipe therein for receiving and conducting the filtrate exteriorly of the tank. Each filter assembly is of the type which includes a filter element preferably in the form of a hollow bag or enclosure. Provision is made for circulating a solution containing solids, diatomaceous earth material or equivalent material through the tank for the purpose of applying or depositing a coating or layer of such material on the exterior surfaces of the filter element for the purpose of separating solids and clarifying liquid as filtrate, after which the liquid to be conditioned is then forced into the tank so that the foreign matter therein will be held by the filter element and material, and thereby allow the filtrate to pass into the manifold and be discharged for the use intended.

The filter element constituting a component of the filter assembly of the subject invention is preferably constructed of some desirable porous fabric or fibrous material, such as cloth or paper. Such filters are relatively fragile or unstable in character so that when subjected to various pressure values or through prolonged use or rough handling when installed, they are torn or eventually break down or disintegrate and allow the unfiltered liquid including foreign matter to flow into the manifold and thereby mix with and contaminate the filtrate therein.

With the foregoing in mind, one of the important objects of the subject invention is to provide a filter assembly comprising, among other things, a filter device and a valve device or trap, connectible with a manifold or the equivalent, and which operates automatically to prevent flow of a liquid containing foreign matter therethrough to the manifold whenever the filter element of the assembly is rendered useless. More specifically in this respect, whenever a filter element breaks or deteriorates portions thereof and/or some of the earth material, foreign matter or solids desired to be contained therein will find their way into the valve device to clog or fill it and thereby stop the flow so that the unfiltered liquid cannot enter the manifold.

A particular object of the invention is to provide a filter assembly in which the filter device thereof includes a support preferably in the form of a single expanded metal member or one or more screens or perforated members secured within a generally rectangular (sometimes circular) frame to constitute a supporting unit or leaf and provide the frame with a fitting for detachable connection with a mounting for attachment to the manifold.

An important object of the invention is to provide an elongated filter bag or cover element which is preferably hollow or tubular for receiving the supporting unit above referred to and which is provided with an opening through which the unit can be inserted into the filter element or bag. The element is preferably of a length greater than the length of the unit so that one extremity thereof extending beyond the unit can be rolled or folded to close the opening, with fasteners preferably in the form of tapes or strings provided on opposite sides of the element for tying to lock the rolled portion in place. An elongated U-shaped connector is preferably employed to clamp together those portions of the element extending beyond the unit. This connector assists one in manually rolling or folding the extending portions and in maintaining the element in a desirable extended enclosing relationship with the supporting unit. The roll or completed fold is tied in place by the tapes which secure to the filter element at locations spaced inwardly from its open end.

A specific object of the invention is to provide a filter device of the kind above described in which fasteners, preferably in the form of yieldable clips, may be placed along the edges of the filter and embrace the leaf frame unit and filter element.

A significant object of the invention is to provide a filter assembly in which the valve device is detachably connected to the filter device through a mounting, which is common to both devices, in a manner whereby the devices can be readily assembled and disassembled to facilitate repair or replacement of the components thereof.

An important object of the invention is to provide one form of a valve or refilter device which preferably includes an elongated outer tubular support provided with openings for communication with the interior chamber of the manifold, an inner tubular support disposed in the outer support and provided with apertures, and a filtering media preferably in the form of a tube interposed between the supports, the arrangement being such that the filtrate will flow through the apertures of the inner support, tube and openings in the outer support into the manifold chamber. The tube may be constructed from any suitable material, such as fabric, felt, paper or screen.

A specific object of the invention is to provide a mounting means which, among other things, is provided with a pair of tubular members for clamping the supports and suspending the filtering media, above referred to, in a proper operative relationship.

Another object of the invention is to provide a modified form of filter assembly having a tubular support with means at its ends, preferably in the form of threads to respectively assist in detachably connecting the ends to a manifold and a mounting.

Another object of the invention is to provide various forms of filter assemblies which may be mounted or supported in different ways on a manifold.

Additional objects of the invention reside in providing a filter assembly comprised of a minimum number of components which offer advantages with respect to manufacture, assembly and installation, efficiency and durability thereof.

Other objects and advantages of the invention will readily become apparent after the description hereinafter set forth is considered in conjunction with the drawings annexed hereto wherein several embodiments of the invention are exemplified.

In the drawings:

FIGURE 1 is a schematic view illustrating filter assemblies of one form mounted in a suspended position in a tank;

FIGURE 2 is a partial vertical section taken through one of the filter assemblies employed in the tank;

FIGURE 3 is an enlarged vertical section of a different form of filter assembly adapted to be mounted in an erect or upstanding position on a manifold;

FIGURE 4 is a vertical section of another form of filter assembly;

FIGURE 5 is an elevational view of an additional filter assembly with portions in section to illustrate its structural details;

FIGURE 6 is a partial perspective view of a filter element or closure which may constitute a component of any of the filter assemblies; and FIGURE 7 is a partial perspective view, similar to FIGURE 6, illustrating the mode of closing off one extremity of the filter element.

Referring first to FIGURES 1 and 2 of the drawings, numeral 11 designates a tank forming a chamber within which a plurality of filter assemblies generally designated 13 are suitably mounted on a manifold 15 in the tank. The tank is provided with an inlet 17 communicating with the tank chamber and an outlet 19, communicating with the manifold, through which the filtrate may be dispensed or discharged. The manifold is preferably anchored to an end closure 21 of the tank in order that the filter assemblies carried by the manifold or mounted in any other suitable way that can be readily removed as a unit or singly from the tank to facilitate replacement or repair thereof.

The filter assembly includes a filter device generally designated 23 and a valve device generally designated 25, which are attached to a mounting 27 common thereto.

The filter device may be designed and constructed in various ways but as exemplified herein, includes a generally rectangular frame 29, a support or grid 31, a fitting or nipple 33 provided with an axial passage 35 and a filter element 37 preferably in the form of a bag, cover or enclosure. The frame is comprised of channel side members 39 and channel end members 41. The grid or support 31 may be constructed in various ways but as depicted is preferably comprised of a pair of spaced foraminated or perforated members, such as screens having their marginal edges welded or otherwise secured to flanges 43 on the channel members as depicted in FIGURE 2. The grid end frame thus provides a supporting unit for the filter element.

The fitting 33 is provided with a recess 45 within which the lower end member 41 of the frame is preferably firmly anchored by welding as indicated at 47. It will be noted that the frame channel members provide a continuous chamber about the grid in order that the filtered liquid may flow through the grid into the chamber before entering the passage 35 in the fitting 33. The fitting is further provided with a reduced exteriorly threaded portion 49 which fits in a threaded opening 51 provided in the lower side of the mounting 27 for detachably connecting the two together. A gasket 52 is interposed between a shoulder 53 on the fitting and the lower surface of the mounting for sealing purposes.

The mounting 27 is provided with a reduced cylindrical portion 55 forming a shoulder 57 which bears against a radial seating flange 59 provided on a ring member 61. The ring member includes a cylindrical portion 63 which extends upwardly into an opening provided therefor in the manifold 15 with its flange 59 preferably permanently anchored to the manifold by welding as indicated at 65. The diameter of the cylindrical portions 55 and 63 of the mounting and ring are such that the mounting may be readily placed in the ring and so that a gasket 67 disposed in an annular exterior groove in the cylindrical portion of the mounting will cooperate with the interior surface of the cylindrical portion of the ring to afford a seal therebetween.

The filter element 37 may be fashioned as desired, but as shown in FIGURE 2 the element is preferably made in the form of a rectangular hollow cover or enclosure. The element may be constructed of any suitable non-permanent porous material or media such as cloth of a natural or synthetic character, felt, paper or plastic, which are subject to damage, deterioration and wear. The upper end of the element is provided with an aperture 69 through which the reduced portion 49 of the fitting 33 extends and its opposite end is open to permit entry of the supporting unit comprising the grid and frame. The opposite sides of the element are preferably provided with tapes 71 (FIGURE 6), and the element is preferably made somewhat longer than the length of the supporting unit so that portions of the element extend beyond the unit where they may be rolled or folded (FIGURE 7) and then secured in this condition by tying the tapes for closing off the open end of the element. In order to facilitate manual overturning, rolling or folding of the extended portions of the element, an elongated U-shaped detachable clip 73 is preferably employed. This clip extends transversely across the element and clamps the extended portions of the filter element together adjacent the lower end member 41 of the frame 29 and exteriorly thereof whereby to maintain the element in a suitable extended enclosing relationship with the frame. The clip 73 is substantially concealed within the confines of the rolled portions of the element as shown in FIGURE 6.

In order to further assist in holding the filter element in proper relationship to the frame, a plurality of fasteners, preferably in the form of channel clips such as 75 are detachably connected in embracing relationship with the side members 39 of the frame and edges of the element as depicted in FIGURE 7. Obviously, fastening means other than the tapes or ties 71, connector 73 and clips 75 may be suitably employed for accomplishing the results intended.

The valve or refiltering device generally designated 25 may be designed and constructed in various ways but as exemplified herein includes an outer tubular support or sleeve 77, a valve element 79 and an inner support or reenforcing member 81, all of which will now be described. The upper side of the mounting 27 is provided with a threaded opening 83 having a diameter somewhat less than the diameter of the lower threaded opening 51. The lower end of the outer support 77 is externally threaded for detachable connection with the threaded opening 83. The support 77 is provided with a longitudinal opening or axial passage 85 and a plurality of transverse or radial apertures or passages 87 communicating with the axial passage and the interior of the manifold as clearly depicted in FIGURE 2.

The lower end of the support 77 is provided with a recessed seat 89 for a radial flange 91 formed on the valve element 79. This element is preferably constructed from a suitable plastic or wire screen and formed in the shape of a cylindrical tube having the aforementioned radial flange and a top wall 93. The mesh of the screen is of such size or character that it will normally allow the liquid to flow freely therethrough. It is to be further understood that the valve may be constructed of any other desirable porous filtering media, such as cloth, paper felt and the like.

The reenforcing member 81 may be designed and constructed in various ways but is preferably constructed from a suitable plastic material and preferably formed in the shape of a cylindrical tube provided with a radial flange 95. This member nests in the valve element with its flange 95 bearing on the radial flange 91 of the element. The member 81 is further provided with a plurality of apertures 97 of a diameter preferably somewhat smaller than the radial or lateral openings 87 in the support 77. The flanges on the valve element 79 and reenforcing member 81 serve to more or less maintain one within the other in a concentric relationship in the outer support 77. With this unique arrangement the liquid after passing through the filter device will normally flow into the valve device through the aperture 97 in the member 81, through valve 79, and into the manifold 15 through the openings 87 in the support 77 as depicted by the arrows in FIGURE 2.

Attention is directed to the important fact that components 79 and 81 support one another in the outer support 77 and that the size of the mesh, passages or ports in the valve 79 are such that they will readily clog when any fragments of the filter element and/or diatomaceous earth filter material thereon find their way into the valve structure whenever the filter element blows or deteriorates. In other words, when the filter element fails, the valve element will readily fill up with such fragments and/or earth material and close the passages or ports, and thereby automatically close the valve and prevent flow of the unfiltered liquid into the manifold to contaminate the filtrate therein. This automatic feature of the invention is important and does not require a complete shut down of the equipment to locate the trouble.

I is to be understood that if found desirable, the inner support or member 81 may be omitted and the relationship of the valve element and member may be reversed to locate the valve in the member.

The upper end of the outer tubular support 77 is preferably provided with a reduced externally threaded portion 99 which extends through an opening 101 provided therefor in the top of the manifold. Fastening means, preferably in the form of a cap nut 103, is connected to the threaded portion 99 for firmly detachably connecting the upper end of the support to the manifold. It will be noted that the manifold is preferably flattened as indicated at 105 in order to provide a seat for a gasket 109' interposed between the seat and nut to seal the connection. By tightening the nut, the valve assembly is clamped to the manifold with the shoulder 57 on the mounting 27 bearing on the ring 61 and the nut against the upper side of the manifold through the gasket.

In view of the foregoing it will be manifest that in the suspended filter assembly disclosed in FIGURES 1 and 2 the liquid passes through the earth material and filter element, grid 31 and into the continuous chamber formed by the channel frame members, passage 35, into the support 81 and the apertures 97 therein, valve element 79, openings 87 in the support 77 and out into the manifold 15 from which the filtrate may be withdrawn from the outlet 19. The tank may be provided with a suitable pressure gauge 109 which may be utilized to assist in determining when new filter elements are required. The factors of time and/or volume of liquid discharged from the tank may also be considered in determining when new filter elements are needed.

Attention is directed to the fact that the filter elements and diatomaceous earth material thereon, and the valve normally serve as filters.

In FIGURE 3 of the drawing there is depicted a modified version of a filter assembly which is mounted to place the filter device thereof in an erect or upstanding position on a manifold as distinguished from being disposed in a depending position as disclosed in FIGURES 1 and 2. This modification may be designed and constructed in various ways but as illustrated includes a filter device and a valve or refilter device.

The filter device includes a suitable perforated support or grid 111 secured in a rectangular or square frame comprised of channel members 113 to constitute a supporting unit which is enclosed by a suitable filter bag element 115. A tubular fitting 117 is preferably secured to one of the channels by welds 119 for establishing communication with the interior of the filter element. The filter element is provided with an opening through which a reduced portion 121 of the fitting extends and a washer 123 surrounds the reduced portion and serves to hold the element in sealed relation to the fitting. A tubular mounting 125 is secured to the reduced portion of the fitting and has a radial flange which engages the washer and seats on an adapter 127 and a plate 129 of a manifold comprising this plate and a pipe 131. The adapter is preferably secured to the manifold by welds and includes a depending portion 133.

The mounting 125 is also provided with a cylindrical portion 135 having an exterior annular groove within which is disposed a gasket 137 for engaging the inner surface of the depending portion 133 of the adapter and an inner surface 139 of the manifold plate to afford a detachable sealed connection between the filter assembly and the manifold. The length of the mounting and the length of the inner surfaces of the adapter and manifold engaged by the gasket are sufficient to provide a stabilized detachable connection between the filter assembly and manifold and maintain the filter device in a proper erect position.

A ring is fitted into the mounting 125 and includes a cylindrical portion 141 and a radial flange 143. The cylindrical portion extends upwardly into the mounting with its end engaging and holding a flange 145 of a valve element 147 against the reduced portion 121 of the fitting 117 for supporting the element in a suspended position. The filter element may be constructed of any suitable media such as a fine screen material through which all of the liquid received through the bag element passes before entry into the manifold.

A tubular guard member 149 has one end preferably secured to the radial flange 143 of the ring by welds 151. This member surrounds and protects the valve element 147 and is provided with apertures 153 and an open bottom through which the filtrate flows into the manifold. The valve element is of a character that it will be automatically closed by solids to prevent flow of contaminate into the manifold or refilters the filtrate whenever the filter bag element fails.

The filter assemblies exemplified in FIGURES 4 and 5 are also constructed along the same principles as those above described for the purpose of effecting an automatic shut-off to prevent contamination of the filtrate. More particularly in this regard, the assemblies disclosed in FIGURES 4 and 5 are similar to the assembly shown in FIGURE 3 since the supporting units and filter bag elements are disposed in erect positions.

In the assembly depicted in FIGURE 4, the filter device thereof comprises a suitable grid 155 and channel frame members to constitute a supporting unit for a filter bag element 157 enclosing the unit. A tubular fitting 159 is preferably secured to one of the channel members by providing the fitting with a notch within which the channel is anchored by welds 161. The fitting includes an exteriorly threaded portion 163 which extends through an opening in the bag and a washer 165 surrounds the threaded portion and bears against the bag. A tubular member 166 is internally threaded and receives the threaded portion of the fitting for clamping the washer against the bag element to seal the element about the supporting unit therefor. The tubular member 166 is also externally threaded and an internally threaded sleeve or union member 167 engages the tubular member for clamping an elongated mounting 169 in relation to the tubular member. The upper end of the mounting is enlarged and provided with a lip 171 and an annular seat 173 surrounding the lip. The lower extremity of the mounting is exteriorly threaded for connection with a threaded opening 175 provided in a plate 177 of a manifold. The mounting also has a lug portion 179 to facilitate connecting the complete filter assembly to the manifold.

An outer cylindrical tubular support 181 has a flange resting on the lip 171 of the mounting. This support is of a diameter somewhat less than the internal diameter of the mounting 169 in order to provide a cylindrical space or passage therebetween so that liquid may flow from the passage through apertures 183 provided in the support. A cylindrical tubular valve element 185 is disposed in the outer support and has a flange which overlies the flange of the support and rests on the seat 173 of the mounting. An inner cylindrical tubular support 187 is disposed in the valve and has a flange overlying the flange on the valve in such a manner that when the sleeve 167 is screwed tightly onto the tubular member 166 the mounting 169 will be drawn toward the member to firmly clamp the flanges on the inner and outer supports and valve therebetween to maintain the supports and valve in a suspended concentric relationship so that the valve is reenforced or stabilized by the supports. It will be noted that the inner support 187 is also provided with apertures 189 through which the filtrate may flow into the valve element. The valve element may be constructed of any desirable porous media such as felt which will readily allow the filtrate to pass therethrough until clogged to automatically stop the flow into the manifold.

In the filter assembly depicted in FIGURE 5 of the drawing, the filter device thereof includes a support 191 of expanded corrugated metal and channel frame members 193 constituting a unit with a filter bag 195 surrounding the unit. A fitting 197 is provided with a notch within which a channel member of the frame is preferably secured by welds 199. The bag element is provided with an opening through which a reduced exteriorly threaded portion 201 of the fitting extends and a mounting 203 is threadedly connected to the fitting for clamping a washer 205 between the fitting and mounting to seal the bag about the unit. The mounting is provided with an exterior annular groove within which is secured a gasket 107 for sealing the mounting in a readily detachable relationship with a manifold.

A tubular cylindrical support 209 has an upper threaded end which is detachably received in an internally threaded portion of the mounting and is also provided with lateral apertures 211. A valve or refilter element 213 preferably in the form of a fine screen material is disposed in the support and has a radial flange 215 secured between the support and mounting for suspending the valve in the mounting. In this modification, as well as in the modification disclosed in FIGURE 3, an inner support for the valve element is not necessary. When the assembly in FIGURE 5 is mounted on a manifold, the filtrate will flow through the fitting and mounting, the valve element and out through the apertures 211 in the support into the manifold until the element fails as a valve.

In view of the foregoing, it will be manifest that although all of the filter assemblies are either depicted with the filter devices thereof disposed upright or in a depending position, it is to be understood that insofar as the subject invention is concerned they may be mounted in other positions, such as in a horizontal or inclined position. Also, that although all of the assemblies illustrated are adapted to utilize a filter bag provided with the various fastening means disclosed in FIGURES 6 and 7, other forms of bags or filters constructed from materials other than those referred to may be employed.

Moreover, it is to be understood that the various forms of valve devices described may be modified in other ways and that valve elements of shapes and materials different from those described may be utilized to accomplish the desired results.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A filter assembly of the kind described comprising a frame and a pair of spaced screen members carried by the frame to constitute a unit, means carried by the frame for attaching it to a mounting, a filter element adapted to support a filtering agent enclosing the unit and provided with an opening through which the unit may be inserted into the element, said element also being provided with an aperture within which the attaching means extends, means cooperating with the attaching means providing a sealed connection between the element and mounting, said element being of a greater length than the unit and having portions extending laterally from the unit which are overturned to close the opening, and means carried by the element for holding the overturned portions in a locked condition.

2. A filter assembly comprising a frame and a hollow paper cover enclosing said frame, said frame comprising a pair of spaced foraminated members for holding opposed portions of the cover apart, said cover having portions defining an opening through which the frame is inserted, said portions being overturned at a location externally of the frame to seal the opening, and elongated tapes having ends secured to the opposed portions of the cover and free ends for tying for holding the overturned portions in place.

3. The assembly defined in claim 2, including a clip extending across the cover for clamping together the said portions defining the opening, and additional clips clamping edge portions of the element to the frame.

4. An assembly of the kind described for filtering a fluid, said assembly comprising a mounting, a fitting detachably connected to the mounting and provided with a passage, a supporting unit secured to the fitting, a filter element adapted to support a filtering agent enclosing the unit and provided with an aperture through which the fitting extends with the material defining the aperture being sealed between the fitting and mounting, means carried by the unit for spacing opposed portions of the element to define a chamber communicating with the passage, a support extending from the mounting and provided with a longitudinal opening and a lateral opening intersecting said longitudinal opening, and valve means arranged in the longitudinal opening and across the lateral opening, said valve means being of such a character that when the filter element is rendered useless unfiltered fluid may be caused to flow into the support so that any foreign matter released directly from the element and carried along with such fluid will clog the valve means and prevent flow of the fluid through the lateral opening of the support.

5. An assembly of the kind described for filtering a fluid containing foreign matter, said assembly comprising a mounting, a fitting detachably connected to the mounting and provided with a passage, a frame secured to the fitting, a filter element adapted to support a filtering agent enclosing the frame and communicating with the passage, said element being provided with an aperture through which the fitting extends with the material defining the aperture being sealed against the fitting, a support extending from the mounting and provided with a longitudinal opening and a lateral opening intersecting said longitudinal opening, and valve means arranged in the longitudinal opening and across the lateral opening, said valve means being of such a character that when the filter element is rendered useless unfiltered fluid may be caused to flow into the support so that foreign matter in the unfiltered fluid or released directly from the element and carried along with such fluid will clog the valve means and prevent flow of such matter through the lateral opening of the support.

6. The assembly defined in claim 5, in which the valve means is tubular and means are operatively associated with the valve means for maintaining same in a stable condition.

7. An assembly of the kind described for filtering a fluid, said assembly comprising a mounting, a fitting detachably connected to the mounting and provided with a passage, a frame secured to the fitting, a filter element adapted to support a filtering agent having a chamber within which the frame is disposed, means affording communication between the chamber and passage, a support extending from the mounting and provided with a longitudinal opening communicating with the passage and an outlet opening intersecting said longitudinal opening, and porous valve means arranged in the longitudinal opening, said valve means being of such a character that when the filter element breaks into one or more fragments and is rendered useless unfiltered fluid may be caused to flow into the support so that one or more of the fragments and/or foreign matter in the fluid or on the element will be carried along with such fluid and close the valve means and prevent flow of the fluid through the outlet opening of the support.

8. An assembly of the kind described for filtering a fluid containing foreign matter, said assembly comprising a fitting for detachable connection with a mounting and provided with a passage, a frame secured to the fitting, a hollow filter element adapted to support a filtering agent enclosing the frame and communicating with the passage, a support connected to the fitting and provided with a longitudinal opening and an outlet opening intersecting said longitudinal opening, and a porous valve arranged in the longitudinal opening of the support, said valve being of such a character that when the filter element is rendered useless unfiltered fluid will flow into the support to cause foreign matter released from the element to be carried along with such fluid and clog the valve and thereby prevent flow of the fluid through the outlet opening in the support.

9. In combination: a manifold provided with opposed openings, a ring secured in one of the openings, a mounting extending into the ring, a fitting supported on the mounting and provided with a passage, filter means adapted to support a filtering agent, said filtering means being carried by the fitting and having a chamber communicating with the passage, an elongated support having one end connected to the mounting and its other end extending through the other opening in the manifold, a nut on the other end of the support operable to force the mounting against the ring and the nut against the manifold, said support being provided with a longitudinal opening communicating with the passage and an aperture, filter media disposed in the longitudinal opening and across the aperture in the support, and a perforated member disposed in the support and reenforcing the filter media.

References Cited in the file of this patent
UNITED STATES PATENTS

| | | |
|---|---|---|
| 311,223 | Billings et al. | Jan. 27, 1885 |
| 679,131 | Thompson | July 23, 1901 |
| 839,772 | Krause | Dec. 25, 1906 |
| 946,862 | Patterson | Jan. 18, 1910 |
| 995,402 | Davis | June 13, 1911 |
| 1,116,234 | Brown | Nov. 3, 1914 |
| 1,362,998 | Lindemann | Dec. 21, 1920 |
| 1,982,924 | Norquist | Dec. 4, 1934 |
| 2,013,776 | Wiesman | Sept. 10, 1935 |
| 2,023,910 | Bacheldor | Dec. 10, 1935 |
| 2,198,175 | Palkin | Apr. 23, 1940 |
| 2,521,094 | Reim | Sept. 5, 1950 |
| 2,551,312 | Bokich | May 1, 1951 |
| 2,669,358 | Young | Feb. 16, 1954 |
| 2,779,478 | Wahlin | Jan. 29, 1957 |